US012567623B2

(12) United States Patent
Beck et al.

(10) Patent No.: US 12,567,623 B2
(45) Date of Patent: Mar. 3, 2026

(54) COOLING DEVICE, ENERGY STORE, AND METHOD FOR COOLING AN ENERGY STORE ON BOTH SIDES

(71) Applicant: AUDI AG, Ingolstadt (DE)

(72) Inventors: Wolfgang Beck, Aichach (DE); Uwe Gerlinger, Kipfenberg (DE); Johannes Haf, Neuburg (DE); Joohwa Sarah Lee, Ingolstadt (DE); Thomas Milde, Wüstenrot (DE); Martin Lindner, Wellheim (DE); Dirk Hoefner, Wellheim (DE); Martin Schüssler, Kösching (DE)

(73) Assignee: AUDI AG, Ingolstadt (DE)

( * ) Notice: Subject to any disclaimer, the term of this patent is extended or adjusted under 35 U.S.C. 154(b) by 502 days.

(21) Appl. No.: 18/189,278

(22) Filed: Mar. 24, 2023

(65) Prior Publication Data

US 2023/0327235 A1     Oct. 12, 2023

(30) Foreign Application Priority Data

Apr. 11, 2022    (DE) .......................... 102022108780.8

(51) Int. Cl.
  H01M 10/6568     (2014.01)
  H01M 10/613      (2014.01)
  (Continued)

(52) U.S. Cl.
  CPC ..... H01M 10/6568 (2015.04); H01M 10/613 (2015.04); H01M 10/6556 (2015.04);
  (Continued)

(58) Field of Classification Search
  None
  See application file for complete search history.

(56) References Cited

U.S. PATENT DOCUMENTS

2020/0338963 A1* 10/2020 Suzuki ................... F28D 15/02
2020/0339010 A1* 10/2020 Villanueva ............. B64U 50/19
(Continued)

FOREIGN PATENT DOCUMENTS

DE            10238235 A1    3/2004
DE         102012217869 A1    4/2014
(Continued)

OTHER PUBLICATIONS

Search Report issued on Nov. 8, 2022, in corresponding German Application No. 102022108780.8, 12 pages.

*Primary Examiner* — Scott J. Chmielecki
(74) *Attorney, Agent, or Firm* — Maier & Maier, PLLC

(57) ABSTRACT

A cooling device for an energy store for cooling a cell group on both sides, having a first cooling unit for a first side of the cell group and a second cooling unit for an opposite second side of the cell group. The first cooling unit includes a first cooling area associated with the cell group, which is divided into a first and second sub-area in relation to a second direction, and the second cooling unit includes a second cooling area associated with the cell group, which is divided into a third and fourth sub-area in relation to the second direction. The first sub-area is opposite the third sub-area and the second sub-area is opposite the fourth sub-area, and the first and fourth sub-areas are located closer to an at least one supply port of a distributor arrangement of the cooling device than the second and third sub-areas.

20 Claims, 3 Drawing Sheets

(51) Int. Cl.

| | |
|---|---|
| *H01M 10/625* | (2014.01) |
| *H01M 10/6556* | (2014.01) |
| *H01M 50/209* | (2021.01) |

(52) U.S. Cl.

CPC ........ *H01M 50/209* (2021.01); *H01M 10/625* (2015.04); *H01M 2220/20* (2013.01)

(56) References Cited

U.S. PATENT DOCUMENTS

| | | | | |
|---|---|---|---|---|
| 2021/0046849 | A1* | 2/2021 | Zhang | H01M 10/486 |
| 2021/0057791 | A1* | 2/2021 | Harugaichi | B60L 50/66 |
| 2021/0057792 | A1* | 2/2021 | Harugaichi | H01M 50/20 |
| 2021/0135307 | A1* | 5/2021 | Bruneau | H01M 50/249 |
| 2022/0102792 | A1* | 3/2022 | Yoo | H01M 50/143 |
| 2022/0263148 | A1* | 8/2022 | Ahunai | B60L 53/305 |
| 2022/0320697 | A1* | 10/2022 | Griffin | H01M 50/627 |

| | | | | |
|---|---|---|---|---|
| 2023/0258420 | A1* | 8/2023 | Krivonak | G05D 23/1917 |
| | | | | 165/101 |
| 2023/0291032 | A1* | 9/2023 | Obrecht | H01M 10/6555 |
| 2023/0292465 | A1* | 9/2023 | Gao | H01M 10/613 |
| 2023/0299386 | A1* | 9/2023 | Yasue | H01M 10/633 |
| 2023/0307737 | A1* | 9/2023 | Gao | H01M 10/6557 |
| 2023/0318118 | A1* | 10/2023 | Hickey | B60L 3/0046 |
| | | | | 429/62 |
| 2024/0055689 | A1* | 2/2024 | Al-Zareer | H01M 10/6568 |
| 2024/0234871 | A1* | 7/2024 | Björneklett | H01M 10/613 |
| 2025/0210781 | A1* | 6/2025 | Flannery | H01M 50/284 |

FOREIGN PATENT DOCUMENTS

| | | |
|---|---|---|
| DE | 102016001145 A1 | 8/2017 |
| DE | 102020125498 B3 | 7/2021 |
| WO | 2021080217 A1 | 4/2021 |
| WO | 2022017979 A1 | 1/2022 |

* cited by examiner

COOLING DEVICE, ENERGY STORE, AND METHOD FOR COOLING AN ENERGY STORE ON BOTH SIDES

FIELD

The invention relates to a cooling device for an energy store for cooling at least a first cell group of the energy store on both sides, wherein the cooling device has a cooling plate arrangement with a first cooling unit through which a coolant can flow for arrangement on a first side of the first cell group and with a second cooling unit through which a coolant can flow for arrangement on a second side of the first cell group, which is opposite the first side in relation to a first direction. Furthermore, the cooling device has a distributor arrangement which has at least one supply port fluidically coupled to the cooling plate arrangement for supplying a coolant to the cooling plate arrangement and at least one discharge port fluidically coupled to the cooling plate arrangement for discharging the coolant supplied to the cooling plate arrangement from the cooling plate arrangement. Furthermore, the invention also relates to an energy store with such a cooling device and a method for cooling at least a first cell group of an energy store on both sides by means of a cooling device.

BACKGROUND

As things stand today, battery cooling systems, in particular for high-voltage batteries in electric vehicles, mostly have a one-sided design. This means that such a battery cooling system is accommodated either at the top or bottom of the battery system, in particular with regard to the intended installation position of such a high-voltage battery in a motor vehicle. Such a cooling system is then designed either as cover cooling or as bottom cooling, for example. In some cases, multi-sided cooling systems are already being implemented. These can be located at the top and bottom of a high-voltage storage system, for example. Cooling is usually distributed by a suitable distribution system, for example with hoses, tubes, corrugated tubes, etc., according to the requirements.

In principle, there is always a desire to cool the battery cells or battery modules to be cooled as evenly and homogeneously as possible. The main problem here is that the coolant supplied via a supply port is significantly cooler than the coolant discharged via a discharge port after it has passed through such a cooling device. Depending on the course of the cooling channels between this supply port and the discharge port, there are areas of the energy store that are cooled to a greater or lesser extent. So far, attempts have been made to avoid such inhomogeneities by using very complex routing of cooling channels.

DE 102 38 235 A1 describes an electrochemical energy store with a heat exchanger structure and a number of electrochemical storage cells in the form of round cells which are arranged in rows next to one another. Channel components are arranged between the round cells, each of which has heat exchanger channels in two adjacent rows which are arranged next to one another. The cooling medium supply to the heat exchanger channels is designed in such a way that oppositely directed flows of the cooling medium occur in two heat exchanger channels arranged next to one another in the same row and in two heat exchanger channels arranged in adjacent rows, whereby largely homogeneous temperatures are achieved in the storage cells.

Such concepts often lead to an extremely space-consuming and complex cooling device. There is also the problem with such concepts that a lot of cooling capacity is lost because the coolant temperatures even out much more between these channels due to the positioning of "warm" channels next to "cold" channels, instead of achieving homogeneous temperatures in the cells as a result. For example, the coolant in a cold cooling channel is heated by the adjacent warm cooling channel before the cooling effect of the cold coolant could be used to cool the cells. In addition, it requires a lot of installation space to provide cooling structures between the rows of cells, since only the cells of the adjacent rows of cells can be cooled by such a cooling unit.

SUMMARY

The object of the present invention is therefore to provide a cooling device, an energy store, and a method that make it possible to cool a cell group of the energy store in the most homogeneous and simple manner possible, in particular so that the most homogeneous temperature distribution possible is established within the cells of the cell group.

A cooling device for an energy store of the invention for cooling at least a first cell group of the energy store on both sides has a cooling plate arrangement with a first cooling unit through which a coolant can flow for arrangement on a first side of the first cell group and with a second cooling unit through which a coolant can flow for arrangement on a second side of the first cell group, which is opposite the first side in relation to a first direction. Furthermore, the cooling device has a distributor arrangement which has at least one supply port fluidically coupled to the cooling plate arrangement for supplying a coolant to the cooling plate arrangement and at least one discharge port fluidically coupled to the cooling plate arrangement for discharging the coolant supplied to the cooling plate arrangement from the cooling plate arrangement. Furthermore, the first cooling unit has a first cooling area, which is assigned only to the first cell group and which is divided in relation to a second direction into a first sub-area through which the coolant can flow and a second sub-area through which the coolant can flow, the second cooling unit having a second cooling area which is likewise assigned only to the first cell group, and which, in relation to the second direction, is divided into a third sub-area through which the coolant can flow and a fourth sub-area through which the coolant can flow. Furthermore, the first sub-area is opposite the third sub-area in relation to the first direction and the second sub-area is opposite the fourth sub-area in relation to the first direction, wherein the first and fourth sub-areas are coupled to the at least one supply port and the second and third sub-areas are coupled to the at least one discharge port, so that the first and fourth sub-areas are located closer to the at least one supply port in the direction of flow than the second and third sub-areas.

The first and second cooling areas are therefore associated with the same cell group, for example one of multiple battery modules, but are arranged on different, in particular opposite, sides of this cell group. Each of these two cooling areas associated with this common cell group is divided into two sub-areas. The first and fourth sub-areas are opposite one another in the first direction, as are the second and third sub-areas, but the first and fourth sub-areas are located closer to the supply port in the direction of flow than the second and third sub-areas. For the sake of simplicity, the sub-areas closer to the supply port are also referred to below as "cold" sub-areas and the sub-areas closer to the discharge port are correspondingly referred to as "warm" sub-areas. The sub-areas are now arranged in such a way or a coolant can flow through them in such a way that a warm sub-area is opposite a cold sub-area in relation to the first direction. The two warm sub-areas and the two cold sub-areas are diagonally opposite one another, so to speak. As a result of this intersecting, two very advantageous effects can now advantageously be achieved at the same time: On the one hand, a significantly better homogenization of the temperature distribution within a cell of the first cell group can be achieved as a result. With this flow concept, a temperature equalization between warm and cold sub-areas takes place less between the sub-areas themselves and more through the first cell group when it is arranged in its intended position between the first and second cooling units. In addition, this temperature equalization by the cell group does not simply take place parallel to the first direction, but also intersects as described due to the intersecting arrangement of the warm and cold sub-areas. So there are not just warm sub-areas above the first cell group and cold sub-areas below the cell group, but both a warm and a cold sub-area above and below the cell group, so that there is also a warm sub-area opposite a cold sub-area. In addition to this significantly better homogenization of the temperature within a cell of the first cell group, another effect can be achieved: In particular in comparison to cooling arrangements on both sides, in which a warm sub-area is arranged opposite another sub-area in the first direction and a cold sub-area is arranged opposite another cold sub-area in this first direction, a reduction of the maximum temperature occurring in a cell can also be achieved. This is due to the fact that the cell poles of a cell are now arranged approximately the same distance away from each cold sub-area, while in other concepts one cell pole is usually at a greater distance from a cold sub-area than the other cell pole. As a result, the heat that develops primarily in the area of the cell poles is very difficult to transport away from the poorly cooled cell pole, which leads to very high maximum temperatures in the area of this poorly cooled cell pole. This intersecting flow concept can also be advantageously avoided and a significantly more efficient heat dissipation, especially from both cell poles, can be implemented. In this way, not only can a significantly more homogeneous temperature distribution of the cell group be achieved, which in turn greatly increases their service life, but also significantly more efficient cooling can be provided, whereby that energy can be saved.

As explained in more detail later, the invention also includes an energy store with such a cooling device or one of its configurations, wherein such an energy store can accordingly have the first cell group as well as other cell groups. Such a cell group comprises at least one battery cell, but preferably multiple battery cells. In principle, these can have any desired configuration, for example as round cells, pouch cells, or prismatic cells. However, a configuration as prismatic cells is preferred within the scope of the invention. These battery cells can be configured as lithium-ion cells, for example. In this case, a cell group can comprise multiple battery cells which are arranged next to one another in a stacking direction. In this case, this stacking direction corresponds to a third direction, which will be defined in more detail later and is perpendicular to the first direction. The first direction preferably corresponds to a vehicle vertical direction based on an intended installation position of the cooling device in a motor vehicle. The first cooling unit can represent a top cooling plate and the second cooling unit a bottom cooling plate, for example. The upper cooling plate can also be provided by a housing cover of a battery housing, for example, and the lower cooling plate by a base of such a battery housing. However, the cooling units can also be provided as separate components. The two cooling units are also configured in such a way that they can respectively cover or cool all of the cells comprised by the energy store at the same time, at least all of the cells comprised by the energy store that are arranged in one plane. The cooling units therefore do not run between cells or rows of cells in a cell plane, which can be defined perpendicular to the first direction, for example. Accordingly, the cooling units can be of essentially planar design, for example as cooling plates, in which case the cooling channels can represent slight elevations relative to this plane. The sides of the cooling units facing the cells are preferably flat or even and without elevations. This simplifies the thermal connection to the cells.

The cell group can further define a battery module. The energy store can not just have one such battery module, but also multiple battery modules, for example. These are then arranged next to one another, for example, in a second direction that is perpendicular to the first and third directions. Optionally, multiple battery modules can also be arranged next to one another in the third direction, but preferably not in the first direction. A common first and second cooling unit can thus be used for cooling these battery modules for multiple battery modules. The first and second cooling unit can therefore provide a common housing cover and a common housing base for the multiple battery modules, for example. In any case, it is preferred that the first and second cooling units are not arranged between two battery modules or generally between two cell groups. As a result, an enormous amount of space can be saved and the configuration of the cooling device is greatly simplified. In addition, it is preferred that the cell poles of a respective battery cell of a cell group are also arranged on opposite sides of the battery cell in relation to the second direction. The cell poles are therefore not arranged at the top or bottom, which significantly simplifies an arrangement of the respective cooling units on the top and bottom. As a result, the two-sided cooling of the cell group is particularly efficient.

The fact that the first and fourth sub-areas are located closer to the at least one supply port in the direction of flow than the second and third sub-areas refers to a direction of flow that runs from the at least one supply port to the at least one discharge port along the cooling channels or cooling channel sections provided by the respective sub-areas. When the cooling device is operated as intended, the second and third sub-areas are arranged downstream of the first and second sub-areas, for example. The designations "downstream" and "upstream" therefore generally refer to the direction of flow of the coolant when the cooling device is operated as intended.

The first and fourth sub-areas can be coupled immediately to the at least one supply port, i. e., connected directly thereto. In this case, the distributor arrangement can also have multiple supply ports, in which case the first and fourth sub-areas can each be coupled or directly connected to one of these multiple supply ports. The second and third sub-areas, on the other hand, are not connected directly to a supply port of the distributor arrangement, but only indirectly via a further sub-area of the cooling plate arrangement, for example via the first or fourth sub-area. On the other hand, it is preferred that the second and third sub-areas are coupled or connected directly and immediately to the at least one discharge port. In this case, too, it is conceivable that the distributor arrangement has multiple such separate discharge ports and the second and third sub-areas are each coupled and directly connected to such a discharge port. However, it is also conceivable that the first and fourth sub-areas are connected to a common supply port and/or the second and third sub-areas are connected to a common discharge port. In any case, the cooling device is preferably designed in such a way that when a coolant is supplied to the cooling plate arrangement via the at least one supply port, it first enters the first and fourth sub-areas and flows through them before it enters the second and third sub-areas and flows through them and is discharged therefrom again through the at least one discharge port. Before the coolant enters the respective third and fourth sub-areas, the coolant has already passed through at least one sub-area of the cooling plate arrangement that is closer to the supply port, for example the first and fourth sub-areas. The coolant, which thus flows through the first and fourth sub-areas, is at least on average cooler than when it flows through the second and third sub-areas. This applies at least when the cooling device is used to cool the first cell group. In principle, it is also conceivable to operate the cooling device generally as a temperature control device. In the course of this, not only a cooling function can be implemented by the cooling device, but for example also a heating function, if required. Heating an energy store can be useful, for example as part of a preconditioning of the energy store before a charging process or also in the winter when the ambient temperatures are cold. In this case, the coolant flowing through the cooling device then has a higher temperature than the energy store or the first cell group in order to heat up this cell group. As part of the implementation of such a heating function, the first and fourth sub-areas would then represent the warmer sub-areas and the second and third sub-areas would represent the cooler sub-areas, since the coolant has already delivered heat to the delivered battery cells when it flows through the second and third sub-areas. Otherwise, the effects that can be achieved by the cooling device are the same as those described for the cooling function. This means that the described cooling device can achieve a significantly more homogeneous temperature distribution within the battery cells even in this case, in which a heating function is to be provided.

If the cooling device is described below primarily with regard to its cooling function, the embodiments described below can be transferred analogously to a heating function that can be performed by the cooling device.

It represents a further very advantageous embodiment of the invention if the first sub-area is fluidically connected to the second sub-area, so that the second sub-area is arranged downstream of the first sub-area, and the third sub-area is fluidically connected to the fourth sub-area, so that the third sub-area is located downstream of the fourth sub-area. Since the first sub-area and the second sub-area are associated with the same cooling unit, namely the first cooling unit, which can be provided in particular in the form of a cooling plate, a fluidic connection between the first and second sub-areas can be implemented particularly easily. The cooling ducts comprised by the first sub-area can simply be fluidically coupled to the cooling ducts of the second sub-area. In particular, these cooling channels can be understood as different cooling channel sections of the same cooling channel running through the first and second sub-area. The same applies to the third and fourth sub-areas as well. The coolant can therefore first be supplied via the at least one supply port to the first sub-area, flow through it, be supplied to the second sub-area through the fluidic connection to the same, flow through it, and then be discharged again via the at least one supply port from the first cooling unit and in particular from the cooling plate arrangement. The same applies to the third and fourth sub-areas. The coolant can thus first be supplied to the fourth sub-area via the at least one supply port, then flow into the third sub-area, flow through it, and be discharged again from the cooling plate arrangement via the at least one discharge port.

The coolant can be, for example, water or a water-based coolant, for example water with glycol and/or other additives for the purpose of antifreeze, or the like. In principle, however, other coolants are also conceivable, generally liquid or also gaseous coolants, wherein a liquid coolant is preferred because of its more efficient cooling effect.

According to another very advantageous embodiment of the invention, a first main direction of flow is associated with the first and fourth sub-areas and a second main direction of flow, which is opposite to the first main direction of flow, is associated with the second and third sub-areas. As a result, the construction of the sub-areas and the cooling plate arrangement can be made particularly simple. The main directions of flow can essentially run parallel to a third direction which is perpendicular to the first and second directions. This third direction can be defined as a stacking direction of a cell stack provided by the cell group. The coolant thus flows first into the first sub-area and through it in the first main direction of flow and thus across all cells of the cell stack, for example. At the end of the cell stack, the coolant can be conducted from the first sub-area into the second sub-area, for example via a deflection channel section, and flow back across all cells in the opposite direction, namely, the second main direction of flow. The same applies analogously to the third and fourth sub-areas as well. Here, the coolant first passes through the fourth sub-area in the first main direction of flow, is then conducted into the third sub-area and runs back again against the first main direction of flow, i.e., in the second main direction of flow. In this way, the distributor arrangement with its ports, i.e., the at least one supply port and the at least one discharge port, can be arranged on one side of the cell group, which is in particular provided on an end face of a cell stack provided by the cell group. This facilitates a particularly space-saving construction.

The main direction of flow is in particular a direction in which the coolant flows at least on average or predominantly when it flows through the sub-areas in question. The cooling channels associated with the respective sub-areas do not necessarily have to run exclusively parallel to this main direction of flow, but can theoretically, although less preferably, run in a wavy or zigzag shape or the like. Furthermore, when diverted from the first to the second sub-area and from the fourth to the third sub-area, the coolant is directed in a direction that is not parallel to any one of the main directions of flow, but substantially perpendicular to them.

According to another advantageous embodiment of the invention, the distributor arrangement has a supply manifold that provides the at least one supply port, which manifold has a main supply port for supplying a coolant to the supply manifold, and a discharge manifold that provides the at least one discharge port, which device has a main discharge port for discharging a coolant from the discharge manifold, in particular wherein the supply manifold provides multiple supply ports fluidically connected to the cooling plate arrangement and the discharge manifold provides multiple discharge ports fluidically connected to the cooling plate arrangement.

The distributor arrangement can therefore basically be divided into a supply manifold and a discharge manifold. These can be provided in the form of tubes, hoses, corrugated tubes or the like, for example. Each of these manifolds can in turn comprise a main port, namely a main supply port and a main discharge port. Here, the coolant is supplied centrally to the cooling device, for example by means of a coolant pump, and discharged from it again. The coolant supplied to the cell connector via this main supply port is distributed via the supply manifold to the respective multiple supply ports connected to the cold plate assembly. The coolant discharged from the cooling plate arrangement is conducted into the discharge manifold via the multiple discharge ports and accordingly collected therein and discharged again from the main discharge port.

This facilitates a particularly advantageous, simple and space-efficient construction of the distributor arrangement. It should also be noted here that a supply port or discharge port does not necessarily have to be assigned specifically to each sub-area of the cooling plate arrangement. For example, some sub-areas may be coupled to the common supply port and/or some sub-areas may be coupled to a common discharge port. This provides more flexibility in the design of the cold plates.

The respective sub-areas are also configured so that a coolant can flow through them. For this purpose, the respective sub-areas can be formed with cooling channels through which this coolant can flow. Accordingly, it is also very advantageous if, for example, the first sub-area has at least one first cooling channel section and the second sub-area has at least one second cooling channel section which is fluidically connected to the first cooling channel section via a first deflection section, wherein the first sub-area has multiple first cooling channel sections running next to one another and the second sub-area has multiple second cooling channel sections running next to one another, which are fluidically connected to the respective first cooling channel sections via respective first deflection sections. In other words, the first and the second sub-area can each have at least one cooling channel section or also multiple cooling channel sections running parallel to one another. If, for example, the first sub-area has multiple such cooling channel sections, a coolant supplied to the first sub-area flows through these first cooling channel sections in parallel. In other words, the coolant supplied to the first sub-area is respectively divided among these multiple first cooling channel sections and respectively flows through these cooling channel sections in parallel in terms of time as well. The coolant is then deflected via the respective first deflection sections into the multiple respective second cooling channel sections of the second sub-area and flows through them again in parallel up to the at least one discharge port. A configuration of the sub-areas with multiple cooling channel sections is particularly advantageous for at least one of the two cooling units. Accordingly, this cooling unit can function as a main cooling unit. In the present example, this unit represents the first cooling unit, which is intended to be arranged on the first side of the cell group. In this case, the first side of the cell group preferably represents the side on which there are no degassing openings or venting openings of the cells of this cell group. Such a venting opening can be provided by a predetermined breaking point, for example a bursting membrane, which is arranged in the cell housing and which opens in the event of a thermal runaway of a cell due to the internal pressure of the cell in order to allow gases to escape from the cell in a defined manner. In this case, it is advantageous that no respective cooling channel sections run in this area of such a venting opening. The venting openings can, for example, be associated with, or arranged on, the second side of the cell group. Accordingly, the second cooling unit, which is intended to be arranged on this second side of the cell group, can be designed in such a way that this area of these venting openings has no cooling channel sections. In other words, no cooling channel sections of the second cooling unit should lie opposite these venting openings in relation to the first direction. The second cooling unit can have correspondingly fewer cooling channel sections. For example, each sub-area of the second cooling unit, i.e., for example, the third and fourth sub-areas, can each be configured with only one cooling channel section, which are connected to one another via a respective deflection section. Accordingly, it is another very advantageous embodiment of the invention when the third sub-area has at least one third cooling channel section, preferably only one third cooling channel section, and the fourth sub-area has at least one fourth cooling channel section, preferably only one fourth cooling channel section, which is fluidically connected to the third cooling channel section via a second deflection section. In this case, the third and fourth cooling channel sections can have a greater distance from one another in the second direction than the distance between the first and second cooling channel sections, for example. This larger distance then provides a free area which can face the venting openings of the cells in relation to the first direction.

As already mentioned at the outset, it is preferable for an energy store to have not just one battery module, which is generally referred to as the first cell group here, but to have multiple battery modules. Accordingly, the cooling device can also be designed with multiple respective cooling areas of the first and second cooling units. The first and second cooling units thus have a first and a second cooling area as described, which correspond to the first cell group. In other cell groups, the first and second cooling units can have a respective third and fourth cooling area, which correspond to such a second cell group, or a fifth and sixth cooling area, which correspond to a third cell group, and so on, for example. In principle, the structure can be the same as described with reference to the first and second cooling areas and the first cell group.

Therefore, it represents a further very advantageous embodiment of the invention when the first cooling unit has a third cooling area which is associated with a second cell group and which is divided in relation to the second direction into a first and second sub-area through which the coolant can flow, wherein the second cooling unit further has a fourth cooling area which is associated with the second cell group and which is divided in relation to the second direction into a third and fourth sub-area through which the coolant can flow, wherein the first sub-area of the third cooling area is opposite the third sub-area of the fourth cooling area in relation to the first direction and the second sub-area of the third cooling area is opposite to the fourth sub-area of the fourth cooling area in relation to the first direction. In addition, the first and fourth sub-areas are coupled to the at least one supply port and the second and third sub-areas are coupled to the at least one discharge port, so that the first and fourth sub-areas are located closer to the at least one supply port in the direction of flow than the second and third sub-areas. In this case, therefore, the first, second, third and fourth sub-areas relate to the third and fourth cooling areas of the first and second cooling units. Also in this case, i.e. for the third and fourth cooling areas, the first and fourth sub-areas represent the sub-areas closer to the supply port and the second and third sub-areas correspond to the sub-areas closer to the discharge port. As described for the first cell group, the same advantages can thus also be achieved for other cell groups and, in particular, a particularly homogeneous temperature distribution can be provided in the cells of these other cell groups, and the maximum temperatures occurring in the cells can also be reduced.

It is also particularly advantageous if the first sub-area of the first cooling area is arranged adjacent to the first sub-area of the third cooling area in the second direction, and the third sub-area of the second cooling area is arranged adjacent to the third sub-area of the fourth cooling area in the second direction. This simplifies the structure of the coolant supply and discharge. For example, the coolant is first supplied to the first subareas via the at least one supply port. If these two first sub-areas which are associated with two different cooling areas of the first cooling unit are arranged next to one another, this can be done via a common supply port, and/or the third sub-areas arranged next to one another can be coupled to a common discharge port, for example. Although this arrangement means that two "warm" sub-areas and two "cold" sub-areas are arranged next to one another, the fact that these sub-areas are associated with different cell groups does not have any adverse effects on the temperature distribution within these respective cell groups.

According to another very advantageous embodiment of the invention, the third sub-area of the second cooling area and the third sub-area of the fourth cooling area are connected to a common discharge port of the distributor arrangement, in particular the discharge manifold. As already mentioned above, this advantageously simplifies the structure of the distributor arrangement, in particular the discharge manifold, which therefore has to provide fewer separate discharge ports. However, for the ports of the first cooling unit, that is to say, for example, the upper cooling plate, it is preferred that each sub-area is assigned its own port, that is to say, supply port or discharge port. The fact that the first cooling unit is the main cooling unit, as mentioned above, means that more coolant is supplied to and removed from this cooling unit per unit of time, so that separate connections are advantageous, especially since there are several cooling channel sections running parallel to one another for each sub-area of the first cooling unit run, are preferred, which then share a common feed or discharge port anyway.

Furthermore, the invention also relates to a motor vehicle with a battery arrangement according to the invention or one of its embodiments. The advantages mentioned for the battery arrangement according to the invention and its embodiments thus apply likewise to the method according to the invention. Furthermore, the energy store according to the invention can also include the first cell group described above, for example. The energy store preferably also includes the second cell group. These cell groups can be configured as battery modules, for example. The energy store can also comprise more than two such cell groups, for example three or four.

According to another advantageous embodiment of the invention, the first and second cell groups each have multiple battery cells arranged next to one another in a third direction, in particular prismatic battery cells, wherein the first and second cell groups are arranged next to one another in the second direction, in particular in a receiving area of a battery housing encompassed by the energy store, which has a housing base delimiting the receiving area in relation to the first direction and a housing cover, wherein the first cooling unit is part of the housing cover or is arranged on the housing cover and the second cooling unit is part of the housing base or is arranged on the housing base. Cooling on both sides for battery modules of an energy store can thus be provided in a particularly efficient and space-saving manner.

Furthermore, a motor vehicle having a battery arrangement according to the invention or one of its embodiments should also be regarded as included in the invention. The motor vehicle according to the invention is preferably designed as an automobile, in particular as a passenger car or truck, or as a passenger bus or motorcycle.

The invention can also be used in stationary energy stores, i.e., the energy store according to the invention and its embodiments can also be stationary energy stores.

Furthermore, the invention also relates to a method for cooling at least a first cell group of an energy store on both sides by means of a cooling device. In particular, this cooling device can be configured as a cooling device according to the invention or one of its embodiments. Accordingly, the cooling device herein also comprises a cooling plate arrangement with a first cooling unit through which a coolant can flow for arrangement on a first side of the first cell group and with a second cooling unit through which a coolant can flow for arrangement on a second side of the first cell group, which is opposite to the first side in relation to a first direction. Furthermore, the cooling device has a distributor arrangement which has at least one supply port fluidically coupled to the cooling plate arrangement for supplying a coolant to the cooling plate arrangement and at least one discharge port fluidically coupled to the cooling plate arrangement for discharging the coolant supplied to the cooling plate arrangement from the cooling plate arrangement. Furthermore, the first cooling unit has a first cooling area which is associated with the first cell group and which, in relation to a second direction, is divided into a first sub-area through which the coolant can flow and a second sub-area through which the coolant can flow, wherein the second cooling unit has a second cooling area which is associated with the first cell group and which is divided in relation to the second direction into a third sub-area through which the coolant can flow and a fourth sub-area through which the coolant can flow, wherein the first sub-area is opposite the third sub-area in relation to the first direction and the second sub-area is opposite the fourth sub-area in relation to the first direction, wherein the first and fourth sub-areas are coupled to the at least one supply port, and the second and third sub-areas are coupled to the at least one discharge port, so that the first and fourth sub-areas in the direction of flow are located closer to the at least one supply port than the second and third sub-areas. Furthermore, the coolant is supplied to the cooling plate arrangement via the distributor arrangement, and the coolant flows through the first and fourth sub-areas before the coolant flows through the second and third sub-areas.

The advantages described for the housing component according to the invention and its embodiments and for the cell housing according to the invention and its embodiments apply likewise to the method according to the invention.

The invention also includes further developments of the method according to the invention, which have features as already described in the context of the further developments of the battery arrangement according to the invention and the motor vehicle according to the invention. For this reason, the respective further developments of the method according to the invention are not described again here.

The invention also comprises the combinations of the features of the described embodiments. The invention also includes implementations that each have a combination of the features of multiple of the described embodiments, unless the embodiments were described as mutually exclusive.

BRIEF DESCRIPTION OF THE FIGURES

Exemplary embodiments of the invention are described hereinafter. Wherein.

DETAILED DESCRIPTION

Figure 1:
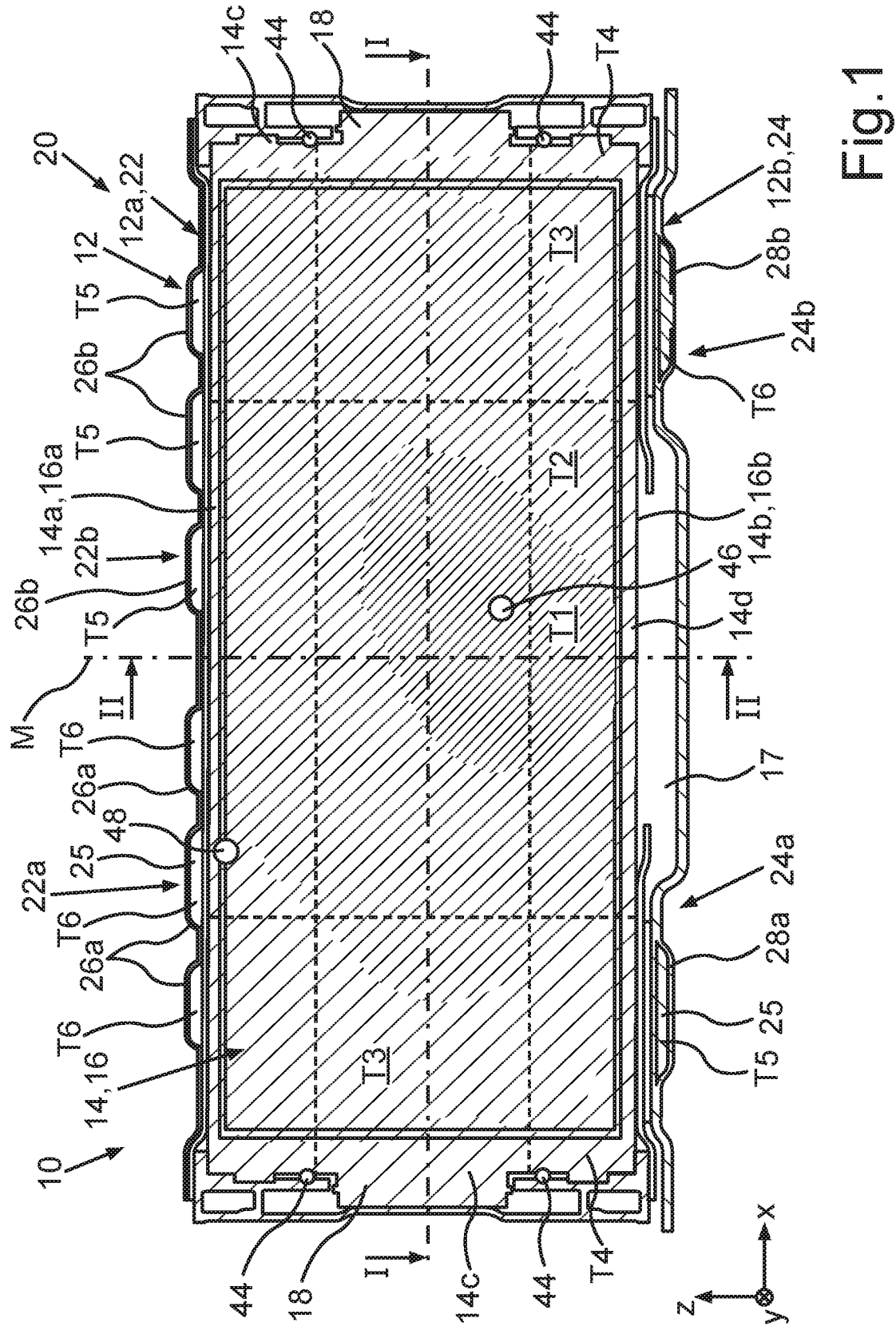
FIG. 1 shows a schematic view of a battery cell with a cooling device according to an exemplary embodiment of the invention.

The exemplary embodiments explained hereinafter are preferred embodiments of the invention. In the exemplary embodiments, the described components of the embodiments each represent individual features of the invention to be considered independently of one another, which each also refine the invention independently of one another. Therefore, the disclosure is also intended to comprise combinations of the features of the embodiments other than those represented. Furthermore, the described embodiments can also be supplemented by other features of the invention as already described.

In the figures, like reference numerals respectively designate elements that have the same function.

FIG. 1 shows a schematic cross-sectional view of a portion of the energy store 10 with a cooling device 12 according to an exemplary embodiment of the invention. In particular, the cross section through a prismatic battery cell 14 of the energy store 10 is shown. The battery cell 14 is part of a cell group configured as a cell module 16. Such a cell module 16, which is also referred to below as a battery module 16, can have multiple such battery cells 14, which are arranged next to one another in a stacking direction, which in the present case corresponds to the y-direction shown here. The cross section shown in FIG. 1 represents a cross section perpendicular to said stacking direction y. In the context of the previous description, this y-direction was also referred to as the third direction. The battery module 16 and the battery cells 14 it comprises each have a first side 14*a*, 16*a* and a second side 14*b*, 16*b* which is opposite in relation to the z-direction shown. In the context of the above description, this z-direction is also referred to as the first direction. Accordingly, the x-direction shown here was referred to as the second direction in the above description. Furthermore, the battery cell 14 has two cell poles 18, one of which being configured as a positive cell pole and the other as a negative cell pole. The cell poles 18 are advantageously arranged here on sides 14*c* of the battery cell 14 that differ from the first and second sides 14*a*, 14*b*. In a particularly advantageous manner, this facilitates very efficient cooling on both sides of such a battery cell 14 and of cell modules 16 built from such battery cells 14.

The energy store 10 comprises a cooling device 12 to cool these battery cells 14, as mentioned above. This in turn comprises a first cooling unit 12*a* for arrangement on the first side 16*a* of the battery module 16 and a second cooling unit 12*b* for arrangement on the second side 16*b* of the battery module 16. The first and second cooling units 12*a*, 12*b* can form a cooling plate arrangement 20 in this case. Since the energy store 10 preferably has additional battery modules 16 which can be arranged next to one another in the x-direction, for example, the first and second cooling units 12*a*, 12*b* can also be designed to be more extensive in the x-direction to accommodate the respective first and second sides 16*a*, 16*b* to cover these additional battery modules in a corresponding manner. FIG. 1 only shows a first area 22 of the first cooling unit 12*a* as an example, which is precisely associated with this first battery module 16. Accordingly, only a second cooling area 24 of the second cooling unit 12*b* is shown, which is associated with this first battery module 16. The first cooling unit 12*a* can therefore have further cooling areas in addition to this first cooling area 22, which are associated with additional battery modules, and the second cooling unit 12*b* can also have additional cooling areas which are associated with additional battery modules. The mode of operation of the cooling device 12 is explained here with reference to this one battery module 16 shown, but can be designed in a completely analogous manner for other battery modules.

The first cooling area 22 is divided into a first sub-area 22*a* and a second sub-area 22*b*. The boundary between the two sub-areas 22*a*, 22*b* can run through an imaginary center plane M, which runs centrally parallel to the y-z plane in relation to the x direction through the cell module 16, for example. Furthermore, the second cooling area 24 is also divided into a third sub-area 24*a* and a fourth sub-area 24*b*. These sub-areas 22*a*, 22*b*, 24*a*, 24*b* are now arranged relative to one another such that the first sub-area 22*a* is opposite the third sub-area 24*a* in the z-direction and the second sub-area 22*b* is opposite the fourth sub-area 24*b* in the z-direction. Furthermore, each sub-area 22*a*, 22*b*, 24*a*, 24*b* is configured with at least one cooling channel section through which a coolant 25 can flow. In this case, for example, the first sub-area 22*a* has multiple first cooling channel sections 26*a* running parallel to one another, and the second sub-area 22*b* likewise has a corresponding number of cooling channel sections 26*b*. The third sub-area 24*a* is formed with only one cooling channel section 28*a*, and the fourth sub-area 24*b* is also formed with only one cooling channel section 28*b*. The first cooling channel sections 26*a* of the first sub-area 22*a* are fluidically connected to the second cooling channel sections 26*b* of the second sub-area 22*b* by a deflection section, which is not shown here. In this case, a first cooling channel section 26*a* is fluidically connected to a respective second cooling channel section 26*b*. The third cooling channel section 28*a* of the third sub-area 24*a* is also fluidically connected to the fourth cooling channel section 28*b* of the fourth sub-area 24*b* via a respective deflection section, which is also not shown here. Coolant 25, which is for example first supplied to the fourth sub-area 24*b*, first flows through this fourth cooling channel section 28*b* and then automatically flows into the third cooling channel section 28*a* of the third sub-area 24*a*. A venting opening 14*d* is also arranged on the second side 14*b* of the battery cell 14. Accordingly, no cooling channel section 28*a*, 28*b* is positioned below this venting opening 14*d* in relation to the z-direction. This facilitates the escape of gas in the event of degassing. Accordingly, the coolant sections 28*a*, 28*b* of the second cooling area 24 are at a greater distance from one another than in the first cooling area 22 of the first cooling unit 12*a*. A free area 17 can thus be provided directly below the venting opening 14*d*.

Figures 5, 6:
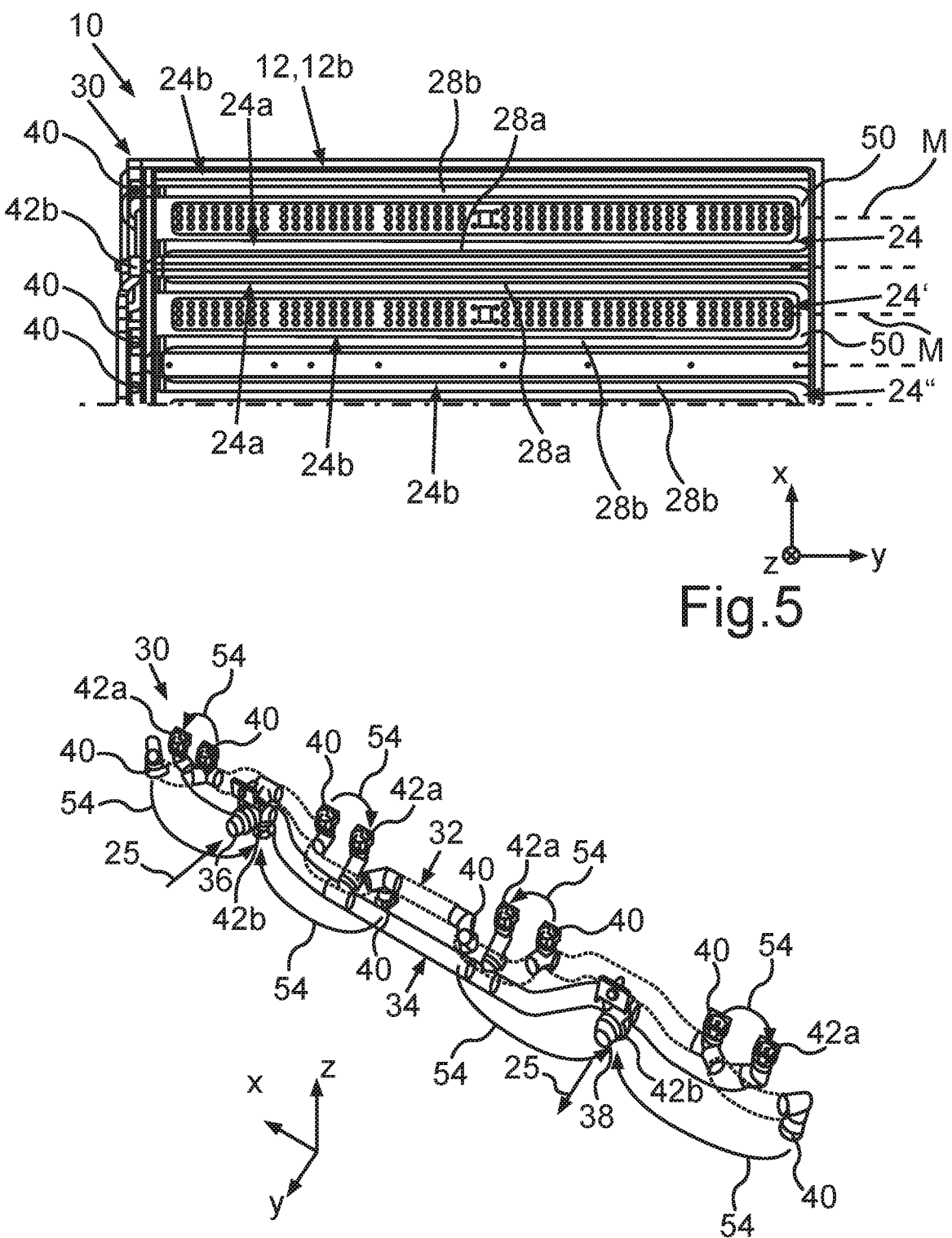
FIG. 5 shows a schematic view of an energy store with a cooling device according to an exemplary embodiment of the invention in a plan view from below.
FIG. 6 shows a schematic and perspective view of the distributor arrangement for a cooling device according to another exemplary embodiment of the invention.

Furthermore, the cooling device 12 comprises a distributor arrangement 30 shown schematically and in perspective in FIG. 6. This distributor arrangement is divided into a supply manifold 32 and a discharge manifold 34. The supply manifold 32 has a main supply port 36 via which the cooling device 12 can be supplied with the coolant 25, while the discharge manifold 34 has a main discharge port 38 via which the coolant 25 can be discharged from the cooling device 12 again after it has passed through it. The main supply port 36 represents the inflow of the cold cooling medium 25 from the vehicle side, and the main discharge port 25 represents the vehicle-side coolant return. This distributor arrangement 30 is fluidically connected to the cooling plate arrangement 20 described with reference to FIG. 1, in particular via at least one supply port 40 via which the coolant 25 can be supplied to the cooling plate arrangement 20, and at least one discharge port 42*a*, 42*b* via which the coolant 25 can be discharged from the cooling plate arrangement 20 and in particular conducted into the discharge manifold 34. The coupling of these ports 40, 42*a*, 42*b* to the cooling plate arrangement 20 will now in turn be explained in more detail with reference to FIG. 1.

The cooling device 12 is now configured such that the first sub-area 22*a* and the fourth sub-area 24*b* are located closer to the at least one supply port 40 in the direction of flow than the second sub-area 22*b* and the third sub-area 24*a*. In contrast, these latter are closer to the at least one discharge port 42*a*, 42*b*. In other words, during operation of the cooling device 12, the coolant 25 is first supplied via the distribution arrangement 30 described above by means of at least one supply port 40 to the first and fourth sub-areas 22*a*, 24*b*, in particular to the cooling channel sections 26*a*, 28*b* contained therein, flows through these sub-areas 22*a*, 24*b*, is then conducted into the second and third sub-areas 22*b*, 24*a*, flows through them and is then discharged from at least one of the discharge ports 42*a*, 42*b*. The coolant 25 heats up when it flows through the respective sub-areas. Therefore, this coolant 25 is cooler at the point in time at which it is conducted into the first and fourth sub-areas 22*a*, 24*b* than at the point in time at which it, after passing through the first and fourth sub-areas 22*a*, 24*b*, enters the second and third sub-areas 22*b*, 24*a*. Due to the described arrangement of these sub-areas 22*a*, 22*b*, 24*a*, 24*b* and the described supply and discharge of the coolant 25, the warm sub-areas 22*b*, 24*a* and the cold sub-areas 22*a*, 24*b* are arranged crosswise in relation to the battery cell 14, as shown in FIG. 1. This results in a significantly more homogeneous temperature distribution across the cell 14 than, for example, in the case when the warmer sub-areas are arranged on one half of battery cell 16 in relation to the x-direction, and the colder sub-areas on the other half.

For better illustration, FIG. 1 also shows different temperature ranges, as these result during the cooling by means of the described cooling device 12 for the energy store 10 and its components. As an example, six different temperature ranges T1, T2, T3, T4, T5, T6 are provided with a reference numeral. The first temperature range T1 represents the range with the highest temperature, for example 38.3° C., and the sixth temperature range T6 represents the range with the lowest temperature, for example 15° C. The fifth temperature range T5 is somewhat higher and is in the range of approx. 20° C., for example. As can be seen in this example, the first and fourth sub-areas 22*a*, 24*b* are slightly cooler than the second and third sub-areas 22*b*, 24*a*. Since these sub-areas are arranged crosswise as shown, a very homogeneous temperature distribution results within the cell 16. The temperature sensors, based on which this temperature distribution was recorded, as shown in FIG. 1, are also designated by 44. Furthermore, 46 designates the point with the highest temperature and 48 the point with the lowest temperature. The distance between these two positions 46, 48 is significantly reduced compared to other flow and cooling concepts. This also means that the maximum temperature associated with point 46 is significantly lower than with other cooling concepts. In this way, not only can a more homogeneous cooling and temperature distribution within a cell 14 be achieved, but also a lowering of the cell temperature in general.

Furthermore, FIG. 1 shows a representation of the temperature distribution as it results for a cell 14 which is arranged very close to the distributor arrangement 30 (see FIG. 6). For another cell 14, which is very far away from this distributor arrangement 30, the temperature difference between the fifth and sixth sections T5, T6 is reduced. In other words, in the area near the deflection sections 50 (compare FIG. 5), in which the coolant 25 is conducted from one sub-area to the other sub-area, the temperature is approximately the same for all sub-areas 22*a*, 22*b*, 24*a*, 24*b*. The temperature distribution across the cell 14 remains approximately unaffected by this. In other words, this advantageous design of the cooling device 12 makes it possible to achieve a very homogeneous temperature distribution in the same way both for cells 14 that are far away from the distributor arrangement 30 and for cells 14 that are arranged close to the distributor arrangement 30. An inhomogeneous heat distribution within the cell 14, as was the case with previous cooling concepts, can thus advantageously be avoided or at least its extent can be significantly reduced. This is achieved by the coolant distributor or the cooling device 12 having a cross flow. This means that, for example, on the lower side the cold coolant flows on one side through the cell 14 and on the upper side on the other. A more homogeneous temperature distribution is thus achieved across the cell 14 and across the entire battery 10, which has a positive effect on the temperature balance and consequently on the overall performance of the store 10, for example in terms of charging time, performance, and so on.

Figures 2, 3, 4:
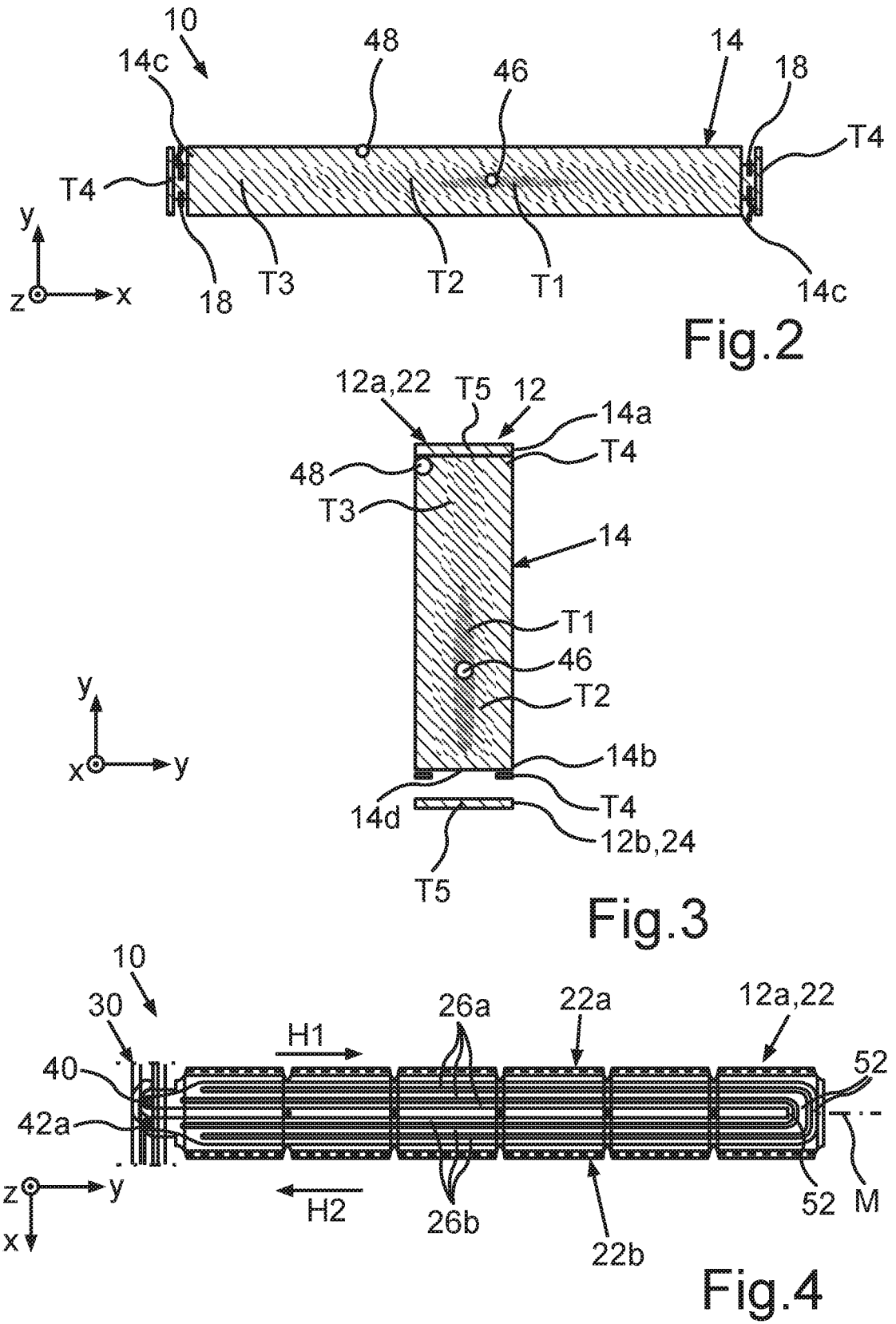
FIG. 2 shows a schematic cross-sectional view of the battery cell and the cooling device arranged thereon from FIG. 1 in a cross section perpendicular to a first direction.
FIG. 3 shows a schematic cross-sectional view of the battery cell and the cooling device arranged thereon from FIG. 1 in a cross section perpendicular to a second direction.
FIG. 4 shows a schematic view of a portion of an energy store with a cooling device according to an exemplary embodiment of the invention.

FIG. 2 again shows a cross section of the energy store 10 along the cross-section line I-I shown in FIG. 1, and FIG. 3 shows the corresponding cross section along the line II-II shown in FIG. 1. The described cross connection within the coolant distributor at the supply results in a homogeneous temperature distribution.

FIG. 4 shows a schematic representation of a plan view of battery cell 10 from below according to an exemplary embodiment of the invention. Here, in particular, the first cooling area 22 of the first cooling unit 12*a*, which is associated with the battery module 16, and part of the distributor arrangement 30 are visible again. The expansion of the first cooling area 22 in the y-direction essentially corresponds to the expansion of the battery module 16. Also visible is now the course of the individual cooling channel sections 26*a*, 26*b* of the first and second sub-areas 22*a*, 22*b*. The first sub-area 22*a* is fluidically or directly connected to a supply port 40, and the second sub-area 22*b* is connected directly to one of the discharge ports 42*a*. Precisely one supply port 40 and one discharge port 42*a* are provided for each cooling region 22 for the first cooling unit 12*a*. Each sub-area 22*a*, 22*b* of the first cooling unit 12*a* is therefore associated with exactly one port, that is, either a supply port 40 or a discharge port 42*a*. Incidentally, this also applies to other cooling areas of the first cooling unit 12*a*. This representation in particular shows the deflection sections 52 which connect the first channel sections 26*a* to one of the second channel sections 26*b*. The main direction of flow H1, which is associated with the first sub-area 22*a*, is opposite to the second main direction of flow H2, which is associated with the second sub-area 22*b*.

FIG. 5 shows a schematic representation of part of the energy store 10 in a plan view from below. A part of the second cooling unit 22*b* of the cooling device 12 is therefore shown here. In particular, not only the second sub-area 24 of the second cooling unit 12*b* is visible here, but also further cooling areas 24', 24", which are associated with further battery modules 16 which can be configured as described for the first battery module 16. These battery modules 16 are therefore arranged next to one another in the x-direction. Each cooling area 24, 24', 24" has two sub-areas 24*a*, 24*b*. Each of these sub-areas 24*a*, 24*b* in turn has a cooling channel section 28*a*, 28*b*, as described above. For each cooling area 24, 24', 24", the corresponding cooling channel sections 28*a*, 28*b* are fluidically connected to one another via a deflection section 50.

The sub-areas 24*a*, 24*b* of the corresponding cooling areas 24, 24', 24" are now arranged relative to one another in such a way that the two third sub-areas 24*a* of two adjacent cooling areas 24, 24' are arranged next to one another and the two fourth sub-areas 24*b* of two adjacent cooling areas 24', 24" are also arranged next to one another. This advantageously makes it possible, at least in part, to use common ports for the supply or discharge of the coolant 25. In the present example, the two third sub-areas 24*a* of the two cooling areas 24, 24' are connected to a common discharge port 42*b*. In particular, it is intended for the second cooling unit 12*b* that each two third sub-areas 24*a* use a common discharge port 42*b*. Two common discharge ports 42*b* are provided for four cell modules 16 and four such two cooling regions 24, 24', 24", respectively. This is shown again in more detail in FIG. 6.

In the present case, the common discharge ports are designated by 42*b* in FIG. 6. The discharge ports, which are designated by 42*a*, are each associated with only one sub-area 22*b* of the cooling plate arrangement 20, as are the respective supply ports 40. The arrows 54 illustrate the direction of flow of the coolant flow or the directions of flow of the coolant distributor 30. Each such flow arrow 54 is therefore associated with exactly one cooling area 22, 24, 24', 24" of the first and second cooling units 12*a*, 12*b*. The arrows 54 thus represent the systematically represented direction of flow in the connected cooling plates or the cooling paths of the upper and lower cooling sides, i.e., the upper cooling unit 12*a* and the lower cooling unit 12*b*. The lower side, i.e. the cooling unit 12*b*, is implemented as a large cooling plate with four paths, i.e. one per battery module 16, wherein two of these paths share a return. The upper side, i.e. the cooling unit 12*a*, is implemented as a module cooling system, for example, in which each cooling module, in particular each cooling area 22 associated with exactly one module 16, has its own ports for supply and return. The intersecting inlets 40 and outlets 42*a*, 42*b* of the cooling ports 40, 42*a*, 42*b* are clearly visible.

Overall, the examples show how a cross-flow coolant distributor of a high-voltage storage system cooled on multiple sides can be provided by the invention.

The invention claimed is:

1. A cooling device for an energy store for cooling at least a first cell group of the energy store on both sides, the cooling device comprising:
    a cooling plate arrangement with a first cooling unit through which a coolant can flow, for arrangement on a first side of the first cell group; and a second cooling unit through which a coolant can flow, for arrangement on a second side of the first cell group, which is opposite the first side in relation to a first direction,
    wherein the cooling device has a distributor arrangement which has at least one supply port fluidically coupled to the cooling plate arrangement for supplying a coolant to the cooling plate arrangement and at least one discharge port fluidically coupled to the cooling plate arrangement for discharging the coolant supplied to the cooling plate arrangement (20) from the cooling plate arrangement;
    wherein the first cooling unit has a first cooling area, which is associated with the first cell group and which, in relation to a second direction, is divided into a first sub-area through which the coolant can flow and a second sub-area through which the coolant can flow,
    wherein the second cooling unit has a second cooling area, which is associated with the first cell group and which, in relation to the second direction, is divided into a third sub-area through which the coolant can flow and a fourth sub-area through which the coolant can flow,
    wherein the first sub-area is opposite the third sub-area in relation to the first direction, and the second sub-area is opposite the fourth sub-area in relation to the first direction, and
    wherein the first and fourth sub-areas are coupled to the at least one supply port, and the second and third sub-areas are coupled to the at least one discharge port such that the first and fourth sub-areas are located closer to the at least one supply port in the direction of flow than the second and third sub-areas.

2. The cooling device according to claim 1, wherein the first sub-area is fluidically connected to the second sub-area such that the second sub-area is arranged downstream of the first sub-area, and the third sub-area is fluidically connected to the fourth sub-area such that the third sub-area is arranged downstream of the fourth sub-area.

3. The cooling device according to claim 1, wherein a first main direction of flow is associated with the first and fourth sub-areas and a second main direction of flow, which is opposite to the first main direction of flow, is associated with the second and third sub-areas.

4. The cooling device according to claim 1, wherein the distributor arrangement has a supply manifold that provides the at least one supply port, which manifold has a main supply port for supplying a coolant to the supply manifold, and a discharge manifold that provides the at least one discharge manifold that provides the at least one discharge port, which manifold has a main discharge port for discharging a coolant from the discharge manifold, in particular wherein the supply manifold provides multiple supply ports fluidically connected to the cooling plate arrangement and the discharge manifold provides multiple discharge ports fluidically connected to the cooling plate arrangement.

5. The cooling device according to claim 1, wherein the first cooling unit has a third cooling area which is associated with a second cell group and which, in relation to the second direction, is divided into a first and a second sub-area through which the coolant can flow, wherein the second cooling unit has a fourth cooling area, which is associated with a second cell group and which, in relation to the second direction, is divided into a third and a fourth sub-area through which the coolant can flow, wherein the first sub-area of the third cooling area is opposite the third sub-area of the fourth cooling area in relation to the first direction and the second sub-area of the third cooling area is opposite the fourth sub-area of the fourth cooling area in relation to the first direction, and wherein the first sub-area of the third cooling area and the fourth sub-area of the fourth cooling area are coupled to the at least one supply port, and the second sub-area of the third cooling area and third sub-area of the fourth cooling area are coupled to the at least one discharge port, such that the first sub-area and the fourth sub-area are located closer to the at least one supply port in the direction of flow than the second sub-area and the third sub-area.

6. The cooling device according to claim 1, wherein the first sub-area of the first cooling area is arranged adjacent to the first sub-area of the third cooling area in the second direction, and the third sub-area of the second cooling area is arranged adjacent to the third sub-area of the fourth cooling area in the second direction.

7. The cooling device according to claim 1, wherein the third sub-area of the second cooling area and the third sub-area of the fourth cooling area are connected to a common discharge port of the distributor arrangement, in particular the discharge manifold.

8. An energy store for a motor vehicle with a cooling device according to claim 1, wherein the energy store comprises the first cell group.

9. The energy store according to claim 8, wherein the energy store comprises the second cell group, wherein the first and second cell groups each have multiple battery cells arranged next to one another in a third direction, in particular prismatic battery cells, wherein the first and second cell groups are arranged next to one another in the second direction, in particular in a receiving area of a battery housing encompassed by the energy store, which housing has a housing base delimiting the receiving area in relation to the first direction and a housing cover, wherein the first cooling unit is part of the housing cover or is arranged on the housing cover and the second cooling unit is part of the housing base or is arranged on the housing base.

10. A method for cooling at least a first cell group of an energy store on both sides by a cooling device, wherein the cooling device has a cooling plate arrangement with a first cooling unit through which a coolant can flow, for arrangement on a first side of the cell group; and with a second cooling unit through which a coolant can flow, for arrangement on a second side of the cell group, which is opposite the first side in relation to a first direction, wherein the cooling device has a distributor arrangement which has at least one supply port fluidically coupled to the cooling plate arrangement for supplying a coolant to the cooling plate arrangement and at least one discharge port fluidically coupled to the cooling plate arrangement for discharging the coolant supplied to the cooling plate arrangement from the cooling plate arrangement;

wherein the first cooling unit has a first cooling area, which is associated with the first cell group and which, in relation to a second direction, is divided into a first sub-area through which the coolant can flow and a second sub-area through which the coolant can flow, wherein the second cooling unit has a second cooling area, which is associated with the first cell group and which, in relation to the second direction, is divided into a third sub-area through which the coolant can flow and a fourth sub-area through which the coolant can flow, wherein the first sub-area is opposite the third sub-area in relation to the first direction, and the second sub-area is opposite the fourth sub-area in relation to the first direction, wherein the first and fourth sub-areas are coupled to the at least one supply port, and the second and third sub-areas are coupled to the at least one discharge port such that the first and fourth sub-areas are located closer to the at least one supply port in the direction of flow than the second and third sub-areas, wherein the coolant is supplied to the cooling plate arrangement via the distributor arrangement, and the coolant flows through the first and fourth sub-areas before the coolant flows through the second and third sub-areas.

11. The cooling device according to claim 2, wherein a first main direction of flow is associated with the first and fourth sub-areas and a second main direction of flow, which is opposite to the first main direction of flow, is associated with the second and third sub-areas.

12. The cooling device according to claim 2, wherein the distributor arrangement has a supply manifold that provides the at least one supply port, which manifold has a main supply port for supplying a coolant to the supply manifold, and a discharge manifold that provides the at least one discharge port, which manifold has a main discharge port for discharging a coolant from the discharge manifold, in particular wherein the supply manifold provides multiple supply ports fluidically connected to the cooling plate arrangement and the discharge manifold provides multiple discharge ports fluidically connected to the cooling plate arrangement.

13. The cooling device according to claim 3, wherein the distributor arrangement has a supply manifold that provides the at least one supply port, which manifold has a main supply port for supplying a coolant to the supply manifold, and a discharge manifold that provides the at least one discharge port, which manifold has a main discharge port for discharging a coolant from the discharge manifold, in particular wherein the supply manifold provides multiple supply ports fluidically connected to the cooling plate arrangement and the discharge manifold provides multiple discharge ports fluidically connected to the cooling plate arrangement.

14. The cooling device according to claim 2, wherein the first cooling unit has a third cooling area which is associated with a second cell group and which, in relation to the second direction, is divided into a first and a second sub-area through which the coolant can flow, wherein the second cooling unit has a fourth cooling area, which is associated with a second cell group and which, in relation to the second direction, is divided into a third and a fourth sub-area through which the coolant can flow, wherein the first sub-area of the third cooling area is opposite the third sub-area of the fourth cooling area in relation to the first direction and the second sub-area of the third cooling area is opposite the fourth sub-area of the fourth cooling area in relation to the first direction, and wherein the first sub-area of the third cooling area and the fourth sub-area of the fourth cooling area are coupled to the at least one supply port, and the second sub-area of the third cooling area and third sub-area of the fourth cooling area are coupled to the at least one discharge port, such that the first sub-area and the fourth sub-area are located closer to the at least one supply port in the direction of flow than the second sub-area and the third sub-area.

15. The cooling device according to claim 3, wherein the first cooling unit has a third cooling area which is associated with a second cell group and which, in relation to the second direction, is divided into a first and a second sub-area through which the coolant can flow, wherein the second cooling unit has a fourth cooling area, which is associated with a second cell group and which, in relation to the second direction, is divided into a third and a fourth sub-area through which the coolant can flow, wherein the first sub-area of the third cooling area is opposite the third sub-area (24a) of the fourth cooling area in relation to the first direction and the second sub-area of the third cooling area is opposite the fourth sub-area of the fourth cooling area in relation to the first direction, and wherein the first sub-area of the third cooling area and the fourth sub-area of the fourth cooling area are coupled to the at least one supply port, and the second sub-area of the third cooling area and third sub-area of the fourth cooling area are coupled to the at least one discharge port, such that the first sub-area and the fourth sub-area are located closer to the at least one supply port in the direction of flow than the second sub-area and the third sub-area.

16. The cooling device according to claim 4, wherein the first cooling unit has a third cooling area which is associated with a second cell group and which, in relation to the second direction, is divided into a first and a second sub-area through which the coolant can flow, wherein the second cooling unit has a fourth cooling area, which is associated with a second cell group and which, in relation to the second direction, is divided into a third and a fourth sub-area through which the coolant can flow, wherein the first sub-area of the third cooling area is opposite the third sub-area of the fourth cooling area in relation to the first direction and the second sub-area of the third cooling area is opposite the fourth sub-area of the fourth cooling area in relation to the first direction, and wherein the first sub-area of the third cooling area and the fourth sub-area of the fourth cooling area are coupled to the at least one supply port, and the second sub-area of the third cooling area and third sub-area of the fourth cooling area are coupled to the at least one discharge port, such that the first sub-area and the fourth sub-area are located closer to the at least one supply port in the direction of flow than the second sub-area and the third sub-area.

17. The cooling device according to claim 2, wherein the first sub-area of the first cooling area is arranged adjacent to the first sub-area of the third cooling area in the second direction, and the third sub-area of the second cooling area is arranged adjacent to the third sub-area of the fourth cooling area in the second direction.

18. The cooling device according to claim 3, wherein the first sub-area of the first cooling area is arranged adjacent to the first sub-area of the third cooling area in the second direction, and the third sub-area of the second cooling area is arranged adjacent to the third sub-area of the fourth cooling area in the second direction.

19. The cooling device according to claim 4, wherein the first sub-area of the first cooling area is arranged adjacent to the first sub-area of the third cooling area in the second direction, and the third sub-area of the second cooling area is arranged adjacent to the third sub-area of the fourth cooling area in the second direction.

20. The cooling device according to claim 5, wherein the first sub-area of the first cooling area is arranged adjacent to the first sub-area of the third cooling area in the second direction, and the third sub-area of the second cooling area is arranged adjacent to the third sub-area of the fourth cooling area in the second direction.

* * * * *